Patented Feb. 9, 1932

1,844,031

UNITED STATES PATENT OFFICE

HEINRICH CLINGESTEIN, OF COLOGNE-ON-THE-RHINE, AND PAUL ZERVAS, OF COLOGNE-MULHEIM, GERMANY, ASSIGNORS TO GENERAL ANILINE WORKS, INC., OF NEW YORK, N. Y., A CORPORATION OF DELAWARE

VALUABLE ACID WOOL AZODYESTUFFS

No Drawing. Application filed July 8, 1930, Serial No. 466,572, and in Germany July 20, 1929.

The present invention relates to new valuable acid wool azodyestuffs, more particularly it relates to azodyestuffs which may be represented by the probable general formula:

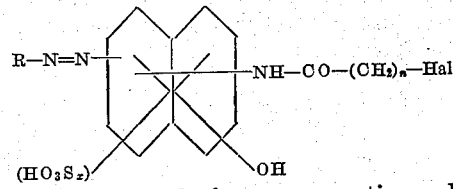

wherein "R" stands for an aromatic nucleus, such as a benzene or naphthalene nucleus, "Hal" stands for a halogen atom having an atomic weight between 35 and 80, "$n$" stands for one of the numbers 1–4, and "$x$" stands for one of the numbers 1 and 2, the hydroxy group standing in ortho-position to the azo group, and wherein the nuclei may be further substituted, for example by halogen, the alkyl-, alkoxy- and nitro-groups.

Our new dyestuffs may be prepared by diazotizing in the usual manner any aromatic amine and coupling in alkaline solution with an ω-halogen-acylamino-naphthol-sulfonic acid. The coupling is soon complete; the dyestuffs are salted out, filtered and dried. They are in form of their alkali metal salts orange to red powders, soluble in water, dyeing wool from an acid bath orange to red shades of good fastness to fulling, combined with a satisfactory evenness.

The ω-halogen-acylamino-naphthol-sulfonic acids used as coupling components in our invention are obtainable by causing to react upon each other in aqueous solution in the presence of an acid-binding agent the corresponding amino-naphthol-sulfonic acid and the corresponding ω-halogen-acyl-chlorides at low temperature, favorably at temperatures not higher than 15° C., until the solution does no more react with nitrous acid.

The invention is illustrated by the following examples, without being limited thereto, the parts being by weight:

*Example 1.*—A solution of diazobenzene from 9.3 parts of aniline is added to a sodium carbonate solution of 40 parts of ω-chloro-acetyl-1-amino-8-naphthol-4.6-disulfonic acid. The isolated dyestuff, having in its free state the following formula:

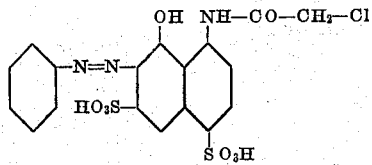

yields on wool, red dyeings fast to fulling.

*Example 2.*—A diazotoluene solution from 10.7 parts of p-toluidine is added to a sodium carbonate solution of 40 parts of ω-chloro-acetyl-1-amino-8-naphthol-3.6-disulfonic acid. The isolated dyestuff, having in its free state the following formula:

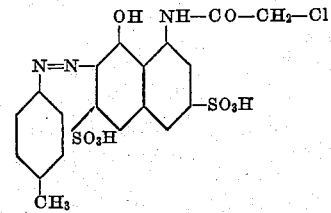

dyes wool red shades of good fastness to fulling

*Example 3.*—A diazo solution from 12.1 parts of m-aminobenzaldehyde is added to a sodium carbonate solution of 40 parts of ω-chloroacetyl-1-amino-8-naphthol-4.6-disulfonic acid. The isolated dyestuff, having in its free form the following formula:

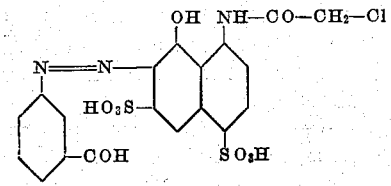

dyes wool red shades.

*Example 4.*—A diazo solution from 19.2 parts of 4-ethyl-acetylamino-2-aminotoluene is coupled with a sodium carbonate solution of 40 parts of ω-chloro-acetyl-1-amino-8-naphthol-4.6-disulfonic acid. The isolated dyestuff, having in its free state the following formula:

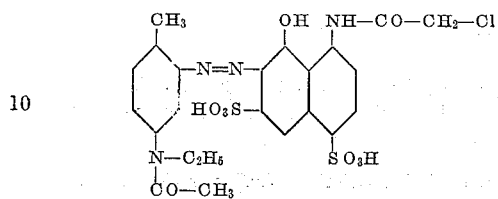

dyes wool a red, fast to fulling.

*Example 5.*—A diazo solution from 10.7 parts of o-toluidine is added to a sodium carbonate solution of 32 parts of ω-chloroacetyl-2-amino-5-naphthol-7-sulfonic acid. The isolated dyestuff, having in its free state the following formula:

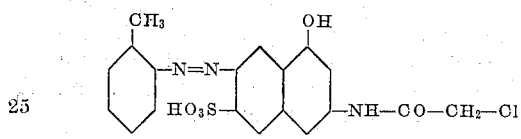

dyes wool an orange.

*Example 6.*—A diazo solution from 9.3 parts of aniline is added to a sodium carbonate solution of 32 parts of ω-chloroacetyl-2-amino-8-naphthol-6-sulfonic acid. The isolated dyestuff, having in its free state the following formula:

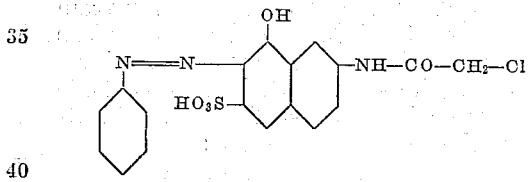

dyes wool a yellowish red.

*Example 7.*—A diazo solution from 9.3 parts of aniline is added to a solution of 41 parts of ω-chloro-propionyl-1-amino-8-naphthol-4.6-disulfonic acid containing an excess of sodium carbonate. The dyestuff, formed having in its free state the following formula:

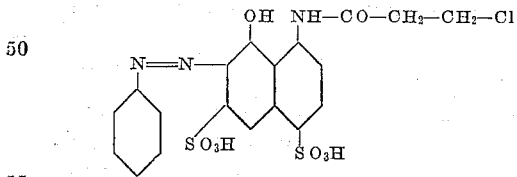

dyes wool a bluish red, fast to fulling.

By using ω-bromoacetyl-,-bromo-butyryl- or -bromopropionyl-aminonaphtholsulfonic acids, dyestuffs of similar satisfactory properties are obtainable.

*Example 8.*—A solution of diazobenzene from 9.3 parts of aniline is coupled with a sodium carbonate solution of 40 parts of ω-chloroacetyl-1-amino-8-naphthol-3.6-disulfonic acid. The dyestuff formed is filtered by suction and dyes wool a red fast to fulling. In its free state it has the following formula:

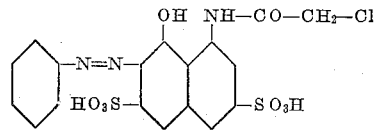

We claim:

1. As new compounds azodyestuffs of the probable general formula:

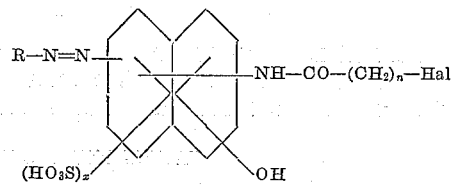

wherein "R" stands for an aromatic nucleus of the benzene or naphthalene series, "Hal" stands for a halogen atom having an atomic weight between 35 and 80, "$n$" stands for one of the numbers 1–4, "$x$" stands for one of the numbers 1 and 2, the hydroxy group standing in ortho-position to the azo group and wherein the nuclei may be further substituted by substituents selected from the group consisting of halogen, alkyl, alkoxy and the nitro group, being in the form of their alkali metal salts orange to red powders, soluble in water, dyeing wool from an acid bath orange to red shades of good fastness to fulling, combined with a satisfactory evenness.

2. As new compounds azodyestuffs of the probable general formula:

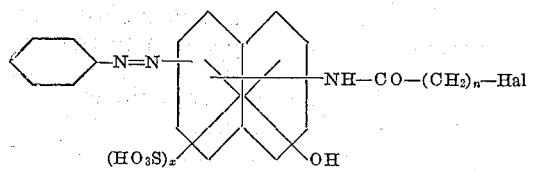

wherein "Hal" stands for a halogene atom having an atomic weight between 35 and 80, "$n$" stands for one of the numbers 1–4, "$x$" stands for one of the numbers 1 and 2, the hydroxy group standing in ortho-position to the azo group and wherein the nuclei may be further substituted by substituents selected from the group consisting of halogen, alkyl, alkoxy and the nitro group, being in the form of their alkali metal salts orange to red powders, soluble in water, dyeing wool from an acid bath orange to red shades of good fastness to fulling, combined with a satisfactory evenness.

3. As new compounds azodyestuffs of the probable general formula:

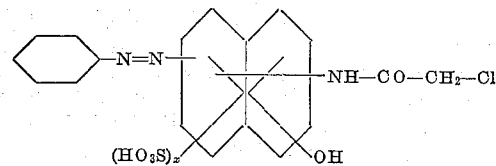

wherein "$x$" stands for one of the numbers 1 and 2, the hydroxy group standing in ortho-position to the azo group and wherein the nuclei may be further substituted by substituents selected from the group consisting of halogen, alkyl, alkoxy and the nitro group, being in the form of their alkali metal salts orange to red powders, soluble in water, dyeing wool from an acid bath orange to red shades of good fastness to fulling, combined with a satisfactory evenness.

4. As new compounds azodyestuffs of the probable general formula:

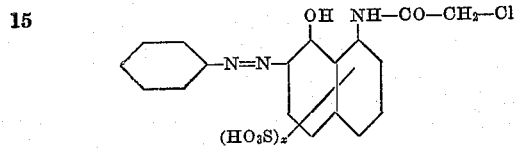

wherein "$x$" stands for one of the numbers 1 and 2, and wherein the nuclei may be further substituted by substituents selected from the group consisting of halogen, alkyl, alkoxy and the nitro group being in the form of their alkali metal salts orange to red powders, soluble in water, dyeing wool from an acid bath orange to red shades of good fastness to fulling, combined with a satisfactory evenness.

5. As a new compound the azodyestuff of the probable formula:

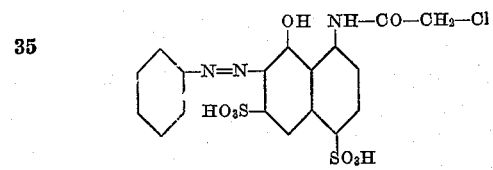

being in the form of its alkali metal salts a red powder, soluble in water, dyeing wool from an acid bath clear red shades of good fastness to fulling, combined with a satisfactory evenness.

6. As a new compound the azo dyestuff of the probable formula:

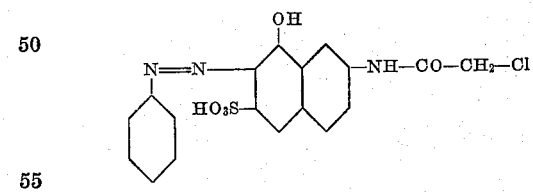

said compound dyeing wool a yellowish-red.

7. As a new compound the azo dyestuff of the probable formula:

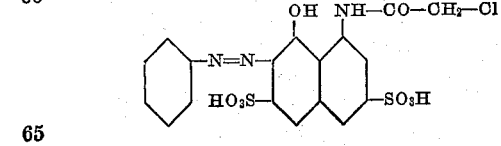

said compound dyeing wool a red fast to fulling.

In testimony whereof, we affix our signature.

HEINRICH CLINGESTEIN.
PAUL ZERVAS.